United States Patent
Yamaguchi et al.

(10) Patent No.: US 10,284,865 B2
(45) Date of Patent: May 7, 2019

(54) ENCODING DEVICE, ENCODING METHOD, AND RECORDING MEDIUM

(71) Applicant: FUJITSU LIMITED, Kawasaki-shi, Kanagawa (JP)

(72) Inventors: Yousuke Yamaguchi, Fukuoka (JP); Shunsuke Kobayashi, Fukuoka (JP); Shotaro Ishikawa, Kawasaki (JP); Hisayoshi Naito, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 458 days.

(21) Appl. No.: 15/000,805

(22) Filed: Jan. 19, 2016

(65) Prior Publication Data

US 2016/0150239 A1    May 26, 2016

Related U.S. Application Data (63) Continuation of application No. PCT/JP2013/070395, filed on Jul. 26, 2013.

(51) Int. Cl.
| | | |
|---|---|---|
| *H04N 19/44* | (2014.01) | |
| *H04N 21/238* | (2011.01) | |
| *H04N 21/24* | (2011.01) | |
| *H04N 19/423* | (2014.01) | |
| *H04N 19/85* | (2014.01) | |
| *H04N 21/414* | (2011.01) | |

(52) U.S. Cl.
CPC ........... *H04N 19/44* (2014.11); *H04N 19/423* (2014.11); *H04N 19/85* (2014.11); *H04N 21/23805* (2013.01); *H04N 21/2401* (2013.01); *H04N 21/41422* (2013.01)

(58) Field of Classification Search
CPC ....................................................... H04N 19/44
USPC .................................................... 375/240.25
See application file for complete search history.

(56) References Cited

U.S. PATENT DOCUMENTS

| | | |
|---|---|---|
| 2002/0004840 A1 | 1/2002 | Harumoto et al. |
| 2006/0109856 A1 | 5/2006 | Deshpande |
| 2011/0142140 A1* | 6/2011 | Kure ................... H04L 65/4069 375/240.25 |

FOREIGN PATENT DOCUMENTS

| | | |
|---|---|---|
| EP | 2337306 A1 | 6/2011 |
| JP | 09-298734 A | 11/1997 |
| JP | 2000-124958 A | 4/2000 |

(Continued)

OTHER PUBLICATIONS

International Search Report and Written Opinion of the International Searching Authority (Form PCT/ISA/210, Form PCT/ISA/220, and Form PCT/ISA/237), mailed in connection with PCT/JP/2013/070395 and dated Oct. 22, 2013 (8 pages).

(Continued)

*Primary Examiner* — Yulin Sun
(74) *Attorney, Agent, or Firm* — Fujitsu Patent Center (57) ABSTRACT

An encoding device includes a processor configured to execute a process. The process includes: first calculating, based on a first system rate for encoding data and transmitting the encoded data to a terminal and a second system rate representing a rate for reproducing the data at the terminal, a decoder storage time during which the encoded data received by the terminal is stored; and adding information of the decoder storage time to the encoded data and transmitting the encoded data added with the information to the terminal.

4 Claims, 5 Drawing Sheets

(56) References Cited

FOREIGN PATENT DOCUMENTS

| JP | 2002-084339 A | 3/2002 |
|---|---|---|
| JP | 2011-130065 A | 6/2011 |

OTHER PUBLICATIONS

Extended European Search Report dated Apr. 12, 2016 for corresponding European Patent Application No. 13890151.7, 9 pages.
Deshpande, Sachin et al., "Buffering Control Methods and Streaming Protocol Extensions for Adaptive Media Streaming," Consumer Communications and Networking Conference, 4th IEEE, Jan. 1, 2007, pp. 308-312, XP031087798.

* cited by examiner

ND RECORDING MEDIUM

ENCODING DEVICE, ENCODING METHOD, AND RECORDING MEDIUM

CROSS-REFERENCE TO RELATED APPLICATION

This application is a continuation application of International Application PCT/JP2013/070395, filed on Jul. 26, 2013, and designating the U.S., the entire contents of which are incorporated herein by reference.

FIELD

The present invention relates to an encoding device, an encoding method, and an encoding program.

BACKGROUND

In a video distribution site that distributes live images, a monitoring system that monitors passengers in a station, etc., images are distributed to a terminal in real time. The quality of distributed images is increasing in accordance with the demand of users who enjoy image distribution services and the volume of image data to be distributed is increasing in order to realize high quality.

A server that distributes images encodes image data and audio data to be distributed and transmits data to be used for multiplexing and synchronizing the audio data and image data to the terminal. A receiving terminal temporarily stores the transmitted encoded data in a buffer and decodes the encoded data when a decoder storage time has elapsed.

However, as the quality of distributed images increases, the decoder storage time at the terminal increases, which increases the delay time. An increase in the decoder storage time increases the wait time until the terminal decodes the distributed encoded data. For this reason, the distributed images are displayed at the terminal late with respect to the images that are actually captured, which impairs synchronization with the live images.

Such an increase in the delay time does not meet the demand of the user and furthermore is problematic depending on the system. For example, in a passenger monitoring system in a station, a delay of an image at a terminal with respect to the actually captured image may cause a delay in finding a passenger who has fallen from a platform. As described above, for realtime image distribution systems, there are demands not only for high quality of distributed images but also for shortening the delay time. The delay time can be calculated with the following Equation (1).

$$\text{delay time} = \text{encoding time} + \text{network jitter absorption time} + \text{decoder storage time} + \text{decoding time} \quad (1)$$

According to Equation (1), the encoding time is a time for encoding data to be distributed at a distribution server. The network jitter absorption time is a time for storing data in packets to be distributed at the distribution server. The decoder storage time is the time from storing received data in a buffer until decoding is started. The decoding time is a time for decoding the encoded data. The decoder storage time has a large share of the delay time and thus shortening the decoder storage time reduces the delay of distributed images.

Patent Document 1: Japanese Patent Application No. 09-298734

Patent Document 2: Japanese Laid-open Patent Publication No. 2002-084339

There is, however, a problem in that it is difficult for the terminal to know the decoder storage time for encoding image data distributed in real time.

When there is little variation in distributed images, because it suffices if a distribution server transmits difference data to a terminal, the volume of data to be distributed is small and, even if the decoder storage time is shortened, there is little effect on the quality of distributed images. However, when the images change suddenly, encoding does not necessarily follow the image change. If the decoder storage time is short, the data for reproducing the images at the terminal is insufficient, which may lead to deterioration of image quality of distributed images. Particularly, because the image quality of distributed images is increasing recently, the volume of image data for reproducing images at the terminal tends to increase.

SUMMARY

According to an aspect of the embodiments, an encoding device includes a processor configured to execute a process including: first calculating, based on a first system rate for encoding data and transmitting the encoded data to a terminal and a second system rate representing a rate for reproducing the data at the terminal, a decoder storage time during which the encoded data received by the terminal is stored; and adding information of the decoder storage time to the encoded data and transmitting the encoded data added with the information to the terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of the encoding device, the encoding method, and the encoding program disclosed herein will be described in detail below with reference to the accompanying drawings. The embodiments are not to be construed as limiting the invention. The embodiments may be combined as appropriate in a range where no contradiction is caused in the processing.

First Embodiment

[Functional Configuration of Encoding Device]

Figure 1:
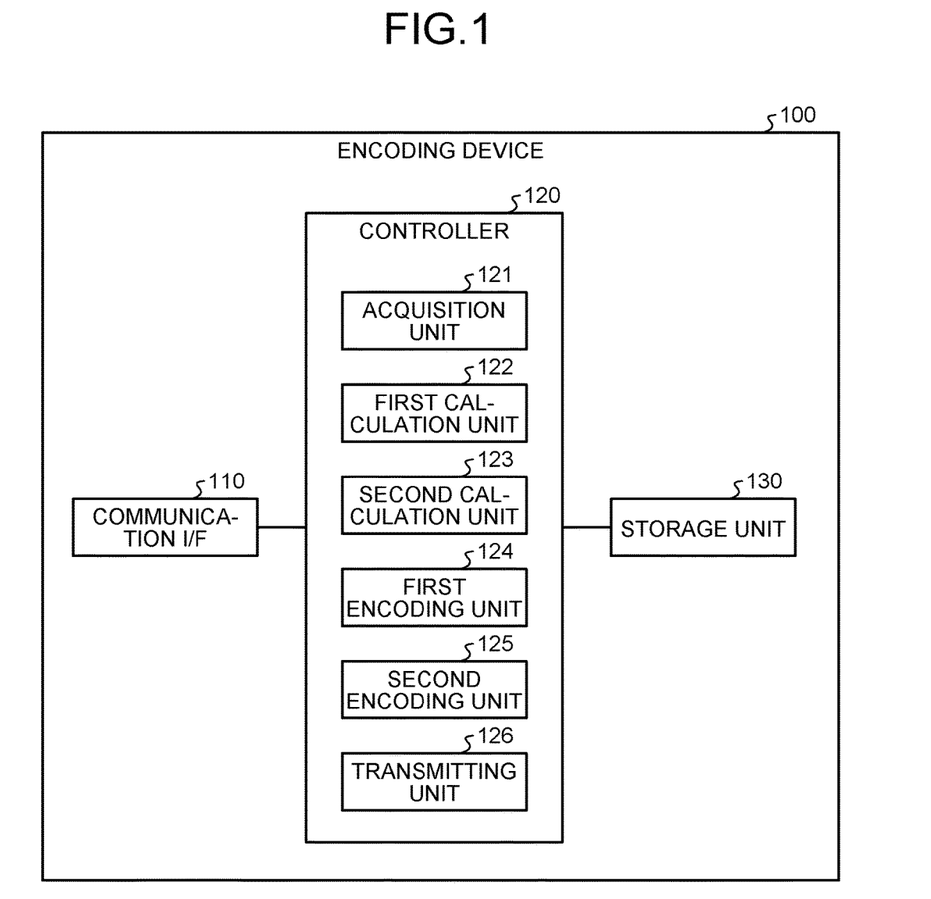
FIG. 1 is a functional block diagram illustrating a configuration of an encoding device according to a first embodiment.

An exemplary functional configuration of an encoding device according to a first embodiment will be described. FIG. 1 is a functional block diagram illustrating the configuration of the encoding device according to the first embodiment. As illustrated in FIG. 1, an encoding device 100 includes a communication I/F 110, a controller 120, and a storage unit 130.

The storage unit 130 stores various parameters that is set in the encoding device 100. For example, the storage unit 130 stores a first system rate, a video rate, an audio rate, and a decoder storage time that are set in advance. The storage unit 130 corresponds to a storage device, for example, a semiconductor memory device, such as a random access memory (RAM), a read only memory (ROM) or a flash memory, a hard disk, or an optical disk.

The controller 120 includes an acquisition unit 121, a first calculation unit 122, a second calculation unit 123, a first encoding unit 124, a second encoding unit 125, and a transmitting unit 126. The functions of the controller 120 may be implemented with an integrated circuit, such as an application specific integrated circuit (ASIC) or a field programmable gate array (FPGA). The functions of the controller 120 may be implemented by, for example, executing a predetermined program by a central processing unit (CPU).

The acquisition unit 121 acquires the various operation parameters in the encoding device from the storage unit 130. For example, the acquisition unit 121 acquires the first system rate, the video rate, the audio rate, and the first decoder storage time that are set in advance. The first system rate is a transmission rate per second (bps) for multiplexing synchronization data of image data and audio data, etc., and transmitting the multiplexed image data, and the first system rate is externally set in advance. The first system rate may be set based on the encoding time of the encoding device. The video rate corresponds to the transmission rate per second (bps) for distributing images to a terminal and increases or decreases depending on the image quality of distributed images. The audio rate corresponds to the transmission rate per second (bps) for distributing audio to the terminal and increases/decreases depending on the image quality of distributed images. The first decoder storage time is a default value of the time during which encoded data is stored in a buffer of the receiving terminal and is externally set in advance.

The first calculation unit 122 calculates a second decoder storage time based on the ratio between a second system rate representing a rate for reproducing the images/audio at the terminal and the first system rate. The second decoder storage time is a decoder storage time that is newly set by the encoding device 100 according to the present embodiment. Specifically, the first calculation unit 122 calculates the second decoder storage time according to the following Equation (2). The second system rate may be calculated by the second calculation unit 123, which will be described below.

$$\text{second decoder storage time} = \text{first decoder storage time}/(\text{first system rate}/\text{second system rate}) \quad (2)$$

For example, when the first decoder storage time is 500 ms, the first system rate is 20 Mbps, and the second system rate is 10 Mbps, the first calculation unit 122 assigns them to Equation (2). The first calculation unit 122 then calculates the second decoder storage time, i.e., 500 ms/(20 Mbps/10 Mbps)=250 ms.

Based on the video rate, the audio rate, and the rate relating to AV synchronization data for multiplexing and synchronizing the image data and the audio data, the second calculation unit 123 calculates the second system rate. The second calculation unit 123 calculates may periodically calculate the second system rate and store the second system rate in the storage unit 130. Specifically, the second calculation unit 123 calculates the second system rate according to the following Equation (3).

$$\text{second system rate} = \text{video rate} + \text{audio rate} + \text{rate relating to multiplexing and AV synchronization data} \quad (3)$$

For example, when the video rate is 8 Mbps, the audio rate is 334 kbps, and the rate of data for multiplexing and AV synchronization is 1.616 Mbps, they are assigned to Equation (3) to calculate the second system rate. The second calculation unit 123 calculates, as the second system rate, 8 Mbps+384 kbps+1.616 Mbps=10 Mbps.

The first encoding unit 124 encodes image data from among the data to be distributed to the terminal. The first encoding unit 124 may end the processing temporarily when the first encoding unit 124 finishes encoding corresponding to the volume of data to be stored in a buffer in the receiving terminal and stop encoding until data to be encoded next is obtained. A the time when the data encoding finishes, the first encoding unit 124 passes the encoded data to the transmitting unit 126. Similarly, the second encoding unit 125 may performs encoding corresponding to the volume of data to be stored in the buffer and, each time the second encoding unit 125 finishes encoding, may pass the encoded data to the transmitting unit 126.

The first encoding unit 124 performs spatial compression on each frame of graphic data used for image data by using a codec for compressing the image data. Furthermore, the first encoding unit 124 may perform time compression for acquiring the difference value between frames of the graphic data in parallel with the spatial compression. For example, the first encoding unit 124 encodes the image data according to standards, such as MPTG-2Video or H.264/MPEG4AV.

The second encoding unit 125 encodes the audio data from among the data to be distributed to the terminal. For example, the second encoding unit 125 performs encoding by compressing the audio data by using a codec for compressing the image data to be distributed. For example, the second encoding unit 125 encodes the audio data according to standards, such as MPTG-1Audio, MPEG2/4AAC, or MPEG4HE-AAC.

The transmitting unit 126 generates AV synchronization data for synchronizing the image data and the audio data. For example, for the synchronizing, the transmitting unit 126 sets a PCR serving as a reference clock for a MPEG2TS stream. Furthermore, the transmitting unit 126 may transmit a TS packet, such as a PAT or a PMT, in a MPEG2TS stream. Furthermore, the transmitting unit 126 adds information on the second decoder storage time to the encoded data.

The transmitting unit 126 multiplexes the encoded image data, the encoded audio data, and the AV synchronization data in order to transmit the data to the terminal and transmits the multiplexed data. For example, the transmitting unit 126 may divide the encoded image data, the encoded audio data, and the AV synchronization data into various channels, section the data by 8 bits, and allocate different times to the respective channels to perform time-division multiplexing and transmit the multiplexed data.

The communication I/F 110 is a communication interface for distributing the encoded image data, the encoded audio data, and the AV synchronization data to the terminal via the Internet.

[System Rate at Each Time]

Figure 2:
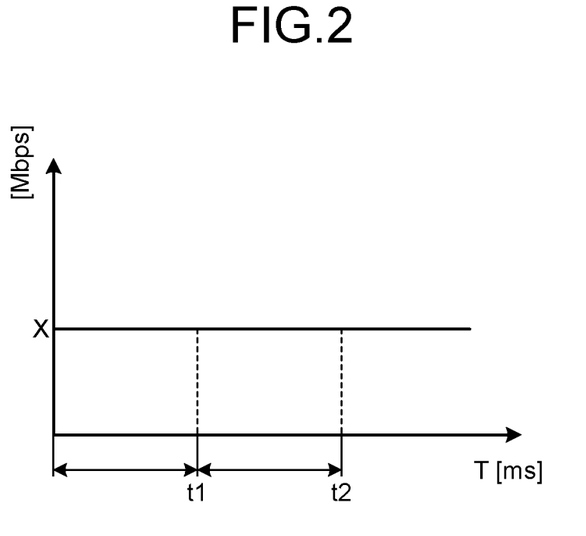
FIG. 2 is a chart illustrating an exemplary system rate at each time and exemplary normal timings at which decoding processing is started.

The system rate at each time will be described here with FIGS. 2 and 3. FIG. 2 is a chart illustrating an exemplary system rate at each time and exemplary normal timings at which decoding processing is started. The horizontal axis in FIG. 2 represents the time T [ms] and the vertical axis in FIG. 2 represents the system rate [Mbps]. As represented in FIG. 2, the system rate successively transitions at a constant X [bps] at each time. On the other hand, the terminal performs decoding processing at a time t1 and a time t2.

Figure 3:
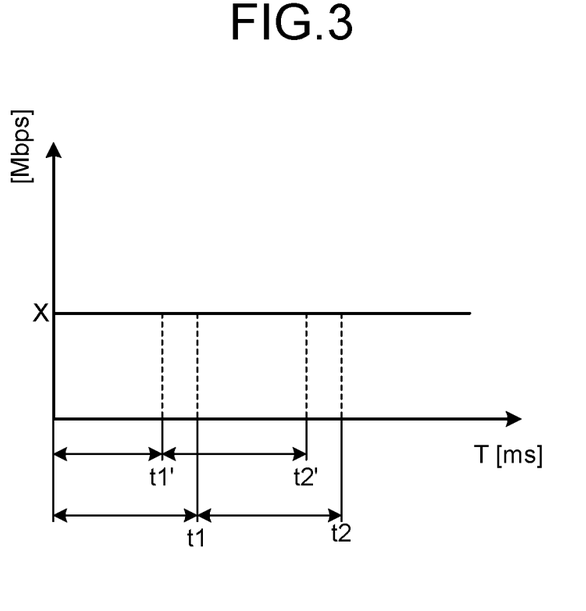
FIG. 3 is a chart illustrating an exemplary system rate at each time and exemplary timings at which encoding processing is started according to the present embodiment.

On the other band, FIG. 3 is a chart illustrating an exemplary system rate at each time and exemplary timings at which encoding processing is started according to the first embodiment. The horizontal axis in FIG. 3 represents the time T [ms] and the vertical axis in FIG. 3 represents the system rate [Mbps]. As illustrated in FIG. 3, the system rate successively transitions at a constant X [bps] at each time as in the case illustrated in FIG. 2. On the other hand, the terminal performs decoding processing at a time t1' preceding the time t1 and a time t2' preceding the time t2.

In other words, according to the present embodiment, the terminal performs decoding processing at t1' preceding the normal time t1 at which decoding is started. Accordingly, the delay time can be shortened.

[Decoder Storage Data Volume at Each Time]

Figure 4:
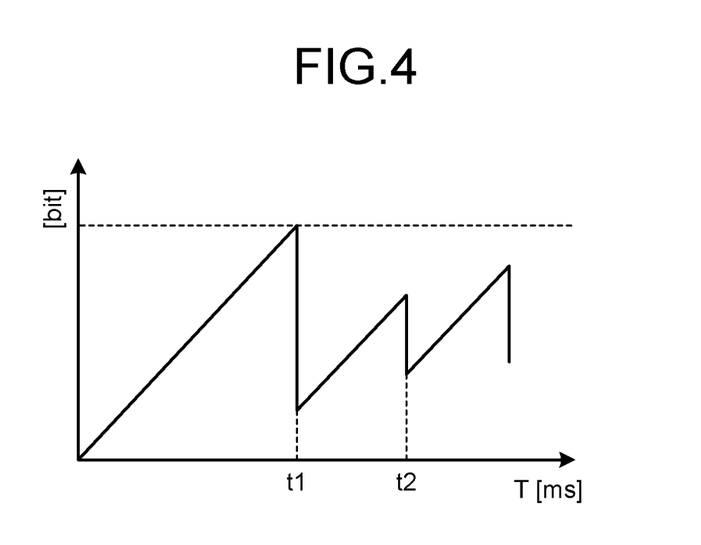
FIG. 4 is a chart illustrating exemplary normal transition of a decoder storage data volume in a receiving terminal.
Figure 5:
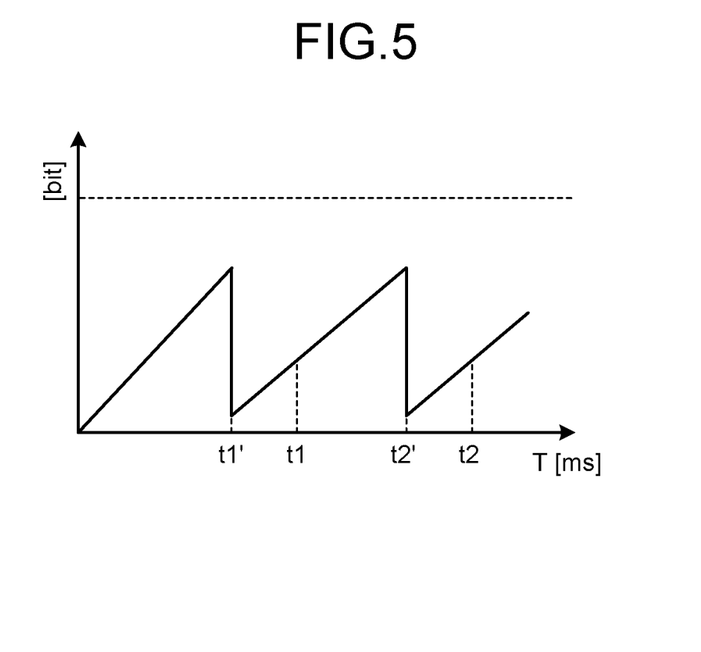
FIG. 5 is a chart illustrating exemplary transition of a decoder storage data volume in a receiving terminal according to the present embodiment.

With FIGS. 4 and 5, the normal transition of a decoder storage data volume at a terminal that has received the encoded data and the transition of a decoder storage data volume according to the present embodiment will be compared to each other here. FIG. 4 is a chart illustrating exemplary normal transition of a decoder storage data volume in a receiving terminal. The horizontal axis in FIG. 4 represents the time T [ms] and the vertical axis represents the volume of data stored in a buffer [bit]. Furthermore, "t1" on the horizontal axis in FIG. 4 represents the time at which the first decoding starts. The time during which data is stored for the first time in the terminal is between 0 and t1. On the other hand, "t2" represents the time at which decoding for the second time is started. The time during which data is stored for the second time in the terminal is between t1 and t2.

According to FIG. 4, the volume of data stored in the buffer increases in proportional to the time until the decoding start time t1. When the time reaches the decoding start time t1, decoding starts and thus the volume of stored data decreases. Thereafter, the volume of stored data increases in proportion to the time until the decoding start time t2. Because the decoder storage, time from the time 0 to the decoding start time t1 corresponds to the wait time until start of decoding, the time is added to the delay time.

On the other hand, FIG. 5 is a chart illustrating exemplary transition of a decoder storage data volume in a receiving terminal according to the present embodiment. The horizontal axis in FIG. 5 represents the time T [ms] and the vertical axis in FIG. 2 represents the volume of data stored in a buffer [bit]. Furthermore, "t1" on the horizontal axis in FIG. 5 represents a time at which decoding is started for the first time according to the present embodiment. A second decoder storage time for the first time at the terminal is between 0 and t1', On the other hand, "t2'" represents a time at which decoding is started for the second time according to the present embodiment. The second decoder storage time for the second time at the terminal is between t1 and t2'. Note that "t1'" in FIG. 4 corresponds to "t1" in FIG. 5 and "t2" in FIG. 4 corresponds to "t2" in FIG. 5.

Similar to the normal embodiment, according to the present embodiment, the volume of data stored in the buffer increases in proportional to the time to the decoding start time t1'; however, the decoding start time t1' at which the terminal starts decoding precedes the time t1. For example, according to the present embodiment, the storage data volume increases in proportional to the time until the time reaches the time t1' preceding the time t1 and, when the time reaches the time t1', the terminal starts decoding. At that time, the storage data volume decreases. Following this, the storage data volume increases in proportional to the time until the time reaches the time t2' preceding the time t2 and the terminal starts decoding when the time reaches the time t2'. At that time, the storage data volume decreases.

In short, the terminal starts decoding the decoded data when the second decoder storage time shorter than the first decoder storage time has passed. Accordingly, the decoder storage time can be shortened and thus the delay time can be shortened.

[Flow of Whole Processing]

Figure 6:
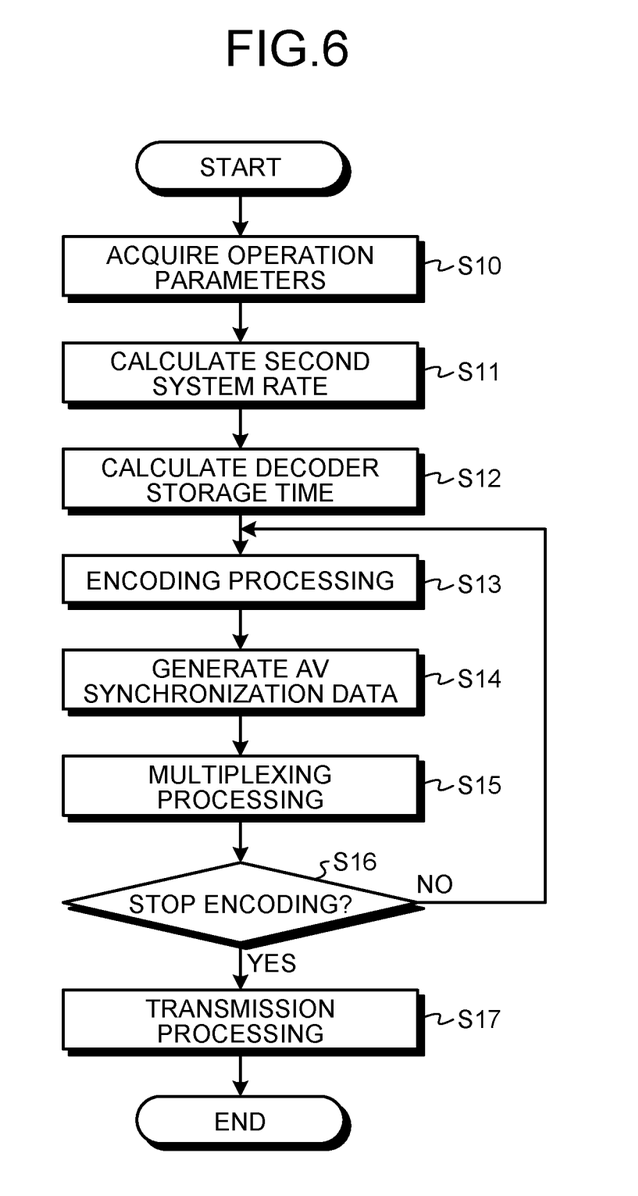
FIG. 6 is a flowchart for explaining the flow of processing performed by an encoding device.

The flow of whole processing performed by the encoding device 100 will be described here. FIG. 6 is a flow chart for explaining the flow of processing performed by the encoding device 100. As illustrated in FIG. 6, first, the acquisition unit 121 acquires a first system rate, a video rate, an audio rate, and operation parameters containing a first decoder storage time from the storage unit 130 (step S10). The second calculation unit 123 calculates a second system rate based on the video rate, the audio rate, and a rate relating to multiplexing and AV synchronization data (step S11). The first calculation unit 122 then calculates a second decoder storage time based on the acquired first decoder storage time, the acquired first system rate, and the second system rate (step S12).

The first encoding unit 124 encodes image data and the second encoding unit 125 encodes audio data (step S13). The transmitting unit 126 generates AV synchronization data for synchronizing the image data and the audio data (step S14). The transmitting unit 126 then multiplexes the encoded image data, the encoded audio data, and the AV synchronization data in order to transmit the data to a terminal (step S15). The transmitting unit 126 determines whether to stop encoding by the first encoding unit 124 and the second encoding unit 125 (step S16). When the second decoding storage time has not elapsed since the start of encoding (NO at step S16), the transmitting unit 126 continues encoding and repeats the processing from step S13 to step S15. On the other hand, when the second decode storage time has elapsed (YES at step S16), the transmitting unit 126 stops encoding and transmits the multiplexed data to the terminal (step S17).

[Effect]

The effect of the present embodiment will be described here. The encoding device 100 includes the first calculation unit 122 that calculates a decoder storage time during which encoded data received by the terminal is stored, based on the first system rate for encoding data and transmitting encoded data to the terminal and the second system rate representing a rate for reproducing the data at the terminal. The encoding device 100 further includes the transmitting unit 126 that adds information on the decoder storage time to the encoded data and then transmits the data to the terminal. This leads to an effect that the image quality does not deteriorate even when the decoder storage time is shortened.

The encoding device 100 further includes the second calculation unit 123 that calculates a second system rate based on the data and data used to multiplex and synchronize the data. Accordingly, the second system rate reflecting the actual video rate and audio rate is calculated and, with the second system rate, the accurate decoder storage time can be obtained.

According to the first embodiment, MPEG-2 is used for a codec. Alternatively, another codec, such as MPEG-1 or MPEG-4, may be used to compress image data, etc.

Figure 7:
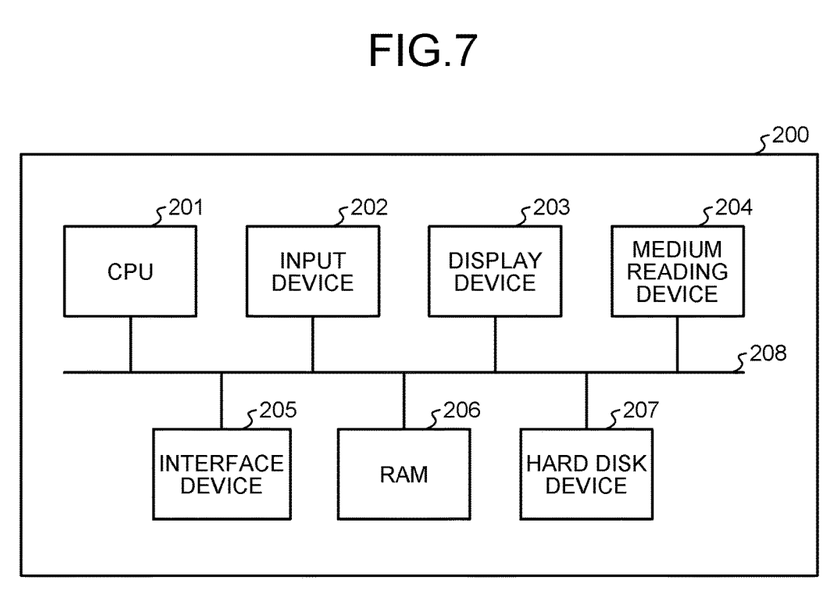
FIG. 7 is a diagram illustrating an exemplary hardware configuration of a computer that relates to the encoding device.

FIG. 7 is a diagram illustrating an exemplary hardware configuration of a computer 200 relating to the encoding device 100. As illustrated in FIG. 7, the computer 200 includes a CPU 201 that executes various arithmetic operations, an input device 202 that receives data inputs, and a display device 203 that displays information on a monitor, or the like, when the data inputs are received. The computer 200 further includes a medium reading device 204 that reads a program, etc. from a storage medium and an interface device 205 for connecting to another device. The computer 200 further includes a RAM 206 that temporarily stores various types of information and a hard disk device 207. The devices 201 to 207 are connected to a bus 208.

The hard disk device 207 stores a program having the same functions as those of the acquisition unit 121, the first calculation unit 122, the second calculation unit 123, the first encoding unit 124, the second encoding unit 125, and the transmitting unit 126 of the controller 120 illustrated in FIG. 1. The hard disk device 207 corresponds to the storage unit 130 and stores operation parameters, such as the system rate, the video rate, the audio rate, and the decoder storage time. The input device 202 receives inputs of various operation parameters.

The CPU 201 performs various types of processing by reading various programs stored in the hard disk device 207 and loading and executing the programs in the RAM 206. The programs can cause the computer 200 to function as the acquisition unit 121, the first calculation unit 122, the second calculation unit 123, the first encoding unit 124, the second encoding unit 125, and the transmitting unit 126 illustrated in FIG. 1.

The above-described encoding program is not necessarily stored in the hard disk device 207. For example, the computer 200 may read and execute the program stored in a storage medium readable by the computer 200. To the storage medium readable by the computer 200, for example, a portable recording medium, such as a CD-ROM, a DVD disk, or a universal serial bus (USB) memory; a semiconductor memory, such as a flash memory; or a hard disk drive correspond. The program may be stored in a device connected to, for example, a public line, the Internet, or a local area network (LAN) and the computer 200 may read the program from the device and execute the program.

According to one aspect, an effect is achieved that a terminal can know the decoder storage time for reproducing high-quality moving images without delay based on image data that is distributed in real time.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding device comprising:
   a processor configured to execute a process including:
   calculating, based on a first system rate that is predetermined and at which data that is encoded in the encoding device is transmitted to a terminal and a second system rate that represents a rate for reproducing the data at the terminal and is calculated based on the data and data used to multiplex and synchronize the data, a decoder storage time; and
   adding information of the decoder storage time to the encoded data and transmitting the encoded data added with the information to the terminal, the terminal storing the transmitted encoded data in a buffer thereof during the decoder storage time, and then repeating the storing when the decoder storage time has elapsed.

2. A system comprising: an encoding device that transmits encoded data to a terminal; and the terminal that receives and decodes the encoded data,
   wherein the encoding device includes:
   a processor configured to execute a process including:
   calculating, based on a first system rate that is predetermined and at which data that is encoded in the encoding device is transmitted to the terminal and a second system rate that represents a rate for reproducing the data at the terminal and is calculated based on the data and data used to multiplex and synchronize the data, a decoder storage time; and
   adding information of the decoder storage time to the encoded data and transmitting the encoded data added with the information to the terminal, and
   the terminal performs storing the received encoded data in a storage area during the decoder storage time and decoding the encoded data when the decoder storage time has elapsed, and then repeats the storing and the decoding.

3. An encoding method comprising:
   calculating, based on a first system rate that is predetermined and at which data that is encoded in the encoding device is transmitted to a terminal and a second system rate that represents a rate for reproducing the data at the terminal and is calculated based on the data and data used to multiplex and synchronize the data, a decoder storage time, by a processor; and
   adding information of the decoder storage time to the encoded data and transmitting the encoded data added with the information to the terminal, the terminal storing the transmitted encoded data in a buffer thereof during the decoder storage time, and then repeating the storing when the decoder storage time has elapsed, by the processor.

4. A non-transitory computer-readable recording medium storing an encoding program that causes a computer to execute a process comprising:
   calculating, based on a first system rate that is predetermined and at which data that is encoded in the encoding device is transmitted to a terminal and a second system rate that represents a rate for reproducing the data at the terminal and is calculated based on the data and data used to multiplex and synchronize the data, a decoder storage time; and adding information of the decoder storage time to the encoded data and transmitting the encoded data added with the information to the terminal, the terminal storing the transmitted encoded data in a buffer thereof during the decoder storage time, and then repeating the storing when the decoder storage time has elapsed.

* * * * *